United States Patent [19]

Inaba

[11] Patent Number: 5,099,508
[45] Date of Patent: Mar. 24, 1992

[54] RADIO TELEPHONE SYSTEM FOR SELECTIVELY ALLOWING A PARTY IN COMMUNICATION WITH A SYSTEM USER TO TRANSMIT A VOICE SIGNAL TO THE USER DURING A HOLD STATE

[75] Inventor: Tsutomu Inaba, Hachioji, Japan

[73] Assignee: Kabushiki Kaisha Toshiba, Kawasaki, Japan

[21] Appl. No.: 550,529

[22] Filed: Jul. 10, 1990

[30] Foreign Application Priority Data

Jul. 12, 1989 [JP] Japan .................................. 1-180771

[51] Int. Cl.⁵ ........................ H04M 11/00; H04B 1/40
[52] U.S. Cl. ........................................ 379/58; 379/61; 379/393; 455/77
[58] Field of Search ..................... 379/58, 60, 61, 63, 379/393, 387; 455/77

[56] References Cited

U.S. PATENT DOCUMENTS

| | | | |
|---|---|---|---|
| 4,451,706 | 5/1984 | Boeckmann | 379/393 |
| 4,492,822 | 1/1985 | Alderman | 379/393 |
| 4,876,708 | 10/1989 | Saequsa et al. | 379/61 |
| 4,896,370 | 1/1990 | Kasparian et al. | 455/77 |
| 4,899,381 | 2/1990 | Lee | 379/393 |
| 4,972,454 | 11/1990 | Toki et al. | 379/58 |

OTHER PUBLICATIONS

Motorola "DYNA T.A.C. Cellular Mobile Telephone Installations", Jun. 3, 1983.
Motorola "DYNA T.A.C. 6000X Universal Mobile Telephone" 1984.
Panasonic "Operation Insruction of Cordless phone Model #KX-T3000" Sep., 1988.
Copyright 1989 p. 710 JC Penney Catalog.

Primary Examiner—James L. Dwyer
Assistant Examiner—William Cumming
Attorney, Agent, or Firm—Finnegan, Henderson, Farabow, Garrett, and Dunner

[57] ABSTRACT

A radio telephone system such as a car telephone having a function of selectively allowing a party communicating with a user of the telephone system to transmit a voice signal to the user during a hold state set by the user. When a predetermined time elapses after a hold state is set by the user of the telephone system, the system allows the party to transmit a voice signal to the user even during the hold state.

19 Claims, 6 Drawing Sheets

RADIO TELEPHONE SYSTEM FOR SELECTIVELY ALLOWING A PARTY IN COMMUNICATION WITH A SYSTEM USER TO TRANSMIT A VOICE SIGNAL TO THE USER DURING A HOLD STATE

BACKGROUND OF THE INVENTION

1. Field of the Invention

The present invention relates to radio telephone systems such as car telephone systems and more particularly, to a radio telephone system wherein a communicating party being asked to hold on can prompt a user of the radio telephone system to release a hold state.

2. Description of the Related Art

A car telephone system has been conventionally provided with a hold function to secure driver's safety and to prevent a secret talk with the party from being leaked.

When the user sets such a car telephone system in its hold state, both send and receive voices at the side of the party are muted and the user side transmits a hold tone indicative of the hold state to the party.

In the hold state, however, there is a problem that when the hold time is long, the party has no chance to contact the user during the hold time and has to just wait patiently.

For the purpose of eliminating the problem, it has been considered to allow the party to be able to send his voice to the user side in the hold state. Even in this case, however, the user undersirably hears the party's voice which is noisy.

The prior art car telephone system also has a problem that when the hold time becomes long in the hold state, the waiting time of the party becomes long and the party may become irritated because of the absence of any means to prompt the user to release the hold state.

SUMMARY OF THE INVENTION

In view of such circumstances, it is an object of the present invention to provide a radio telephone system which can eliminate the above problems and wherein a communicating party can prompt a user of the radio telephone system to release a hold state even in the hold state, whereby the waiting time of the communicating party can be shortened and the user can hear the party's voice with less noise.

In accordance with an aspect of a radio telephone system of the present invention, when a predetermined time elapses after setting of the hold state in a speech mode but when the hold state is not released, the communicating party can send an audible tone signal to the user of the radio telephone system.

As a result, if the party talks to the user of the system through the telephone set then the party's voice is output at the side of the user, whereby, when the user listening to the party's voice releases the hold state, the waiting time of the party can be shortened even in the hold mode.

In addition, since the party's voice is output at the user side only after passage of the predetermined time, the user can hear the party's voice with less noise.

DESCRIPTION OF THE PREFERRED EMBODIMENTS

Embodiments of the present invention will be detailed with referece to the attached drawings.

Figure 1:
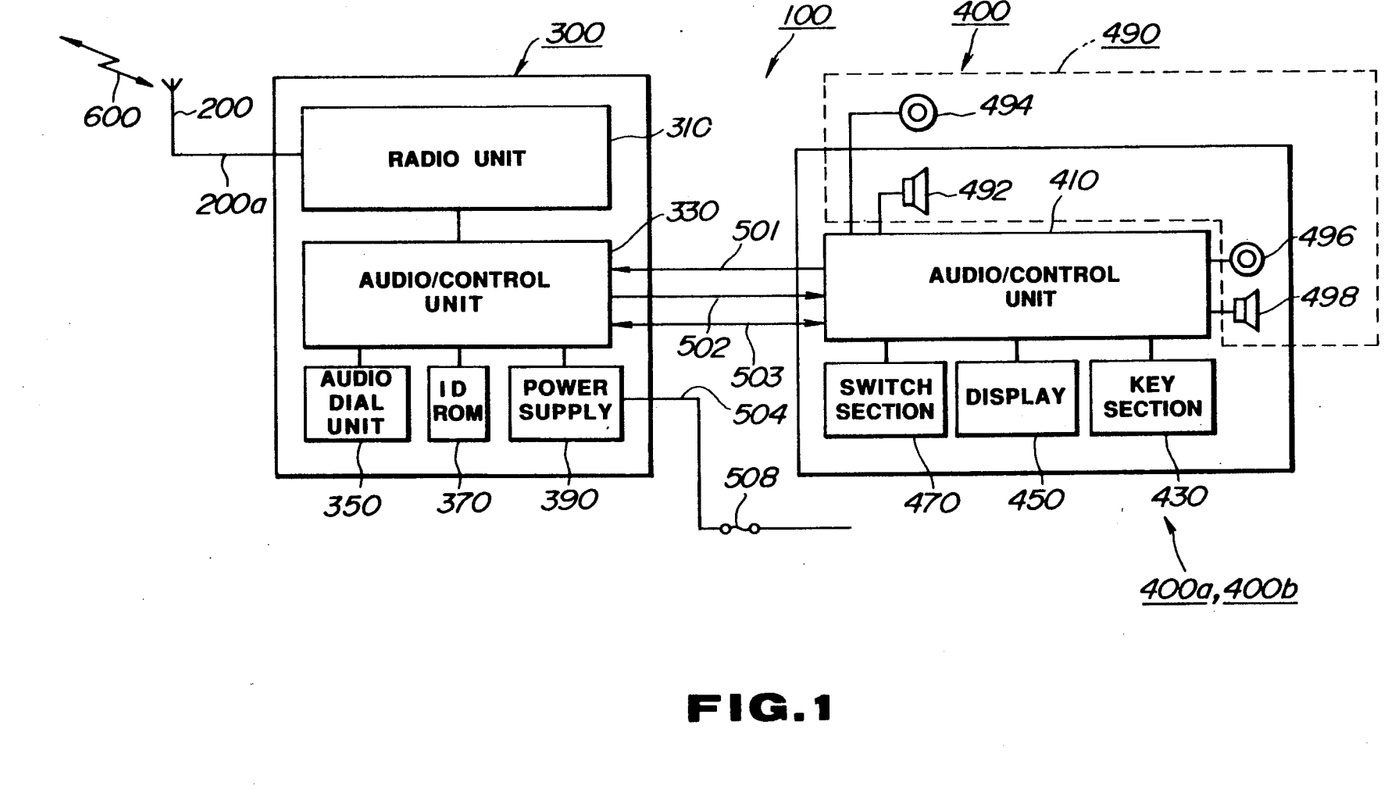
FIG. 1 schematically shows an arrangement of a car telephone system in accordance with an embodiment of the present invention.

Referring first to FIG. 1, there is shown a block diagram showing an arrangement of a car telephone system 100 in accordance with an embodiment of the present invention, which includes an antenna 200, a transceiver 300 and a telephone set 400, the antenna 200 being mounted outside a car, the transceiver 300 being installed in the trunk of the car, the telephone set 400 being set in the vicinity of a driver seat inside the car.

The transceiver 300 comprises, as its major parts, a radio unit 310 for forming a spatial radio communication line 600 with a base station (not shown) through the antenna 200 to realize signal transfer between the radio unit 310 and the base station, an audio/control unit 330 for performing general control over the entire system, a voice dial unit 350 for performing voice recognition, voice composition and so on, an ID ROM 370 for registering therein ID numbers and associated telephone numbers, and a power supply 390 for receiving power from a battery carried on the car through a fuse 508 to supply power to the units of the transceiver 300.

The telephone set 400 comprises, as its major parts, an audio/control unit 410 for performing general control over the entire telephone set 400 under control of a command received from the audio/control unit 330 of the transceiver 300, a key section 430 through which an operator enters a key input, a display 450 on which a predetermined data is displayed, a switch section 470 for performing various sorts of switching operations, and a voice input/output unit 490 through which an audible voice is input or output.

The voice input/output unit 490 comprises a loudspeaker 492 for amplification of speaker voice, a hand-free microphone 494, a handset microphone (transmitter) 496 and a handset receiver 498 both built in a handset.

The telephone set 400 is actually made up of a telephone set body 400a and a handset 400b provided to be separated therefrom. The telephone set body 400a, which includes a part of the audio/control unit 410, the switch section 470, and the loudspeaker 492 of the voice input/output unit 490, is connected with the hand-free microphone 494 hung on, for example, a sun visor or the like in the vicinity of the driver seat.

The handset 400b, on the other hand, includes a part of the audio/control unit 410, the key section 430, the display 450, and the handset microphone 496 and receiver 498 of the voice input/output unit 490.

Figure 2:
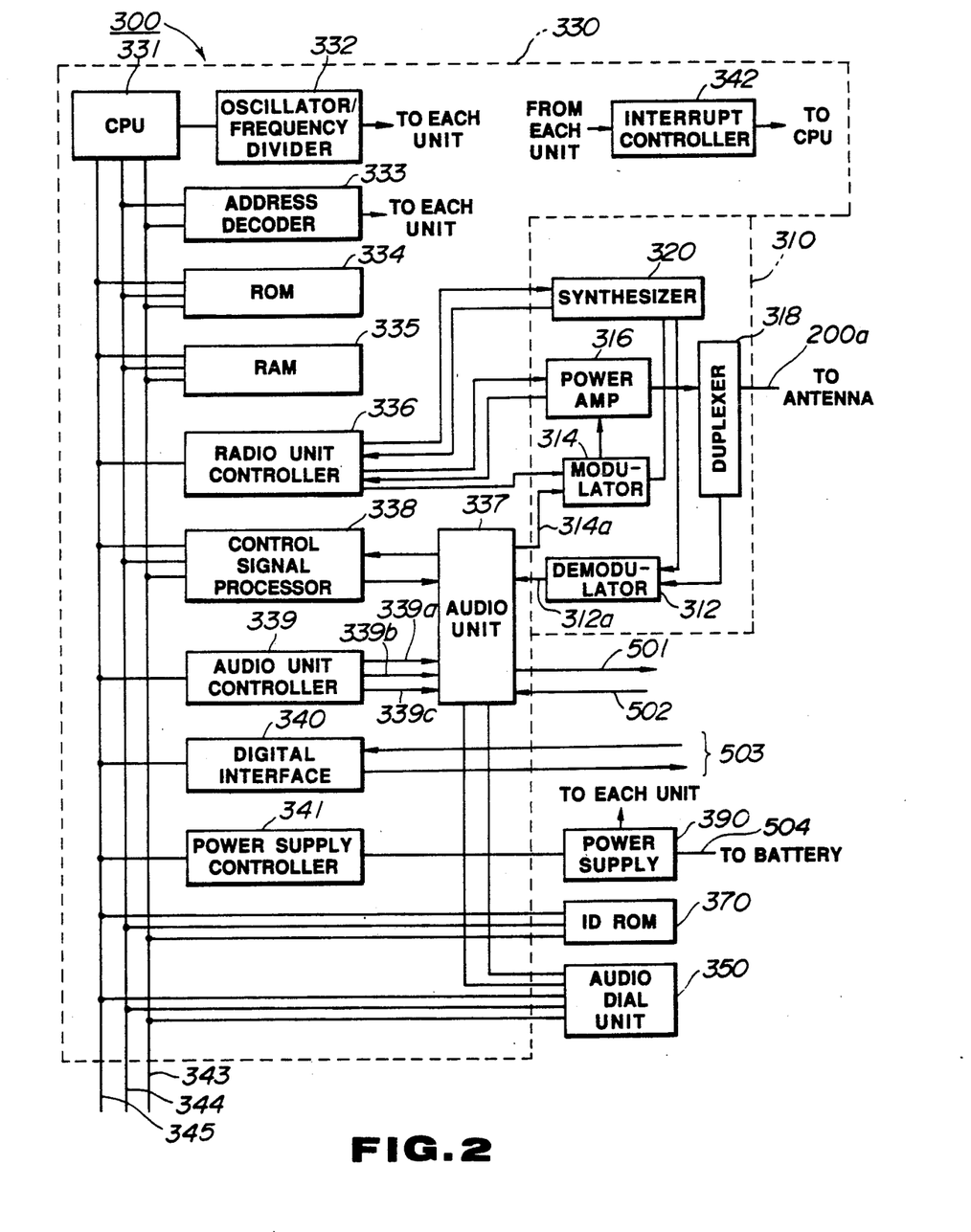
FIG. 2 is a block diagram showing an arrangement of a transceiver used in the car telephone system.

FIG. 2 shows, in block diagram, the details of the transceiver 300. In the drawing, the radio unit 310 has a demodulator 312, a modulator 314, a power amplifier 316, a duplexer 318 and a synthesizer 320. More in detail, the demodulator 312 inputs a signal received via the duplexer 318 from the base station (not shown) through the antenna 200 to demodulate the input signal. The input signal contains an audible voice signal, a control signal and so on.

The modulator 314 receives and modulates the audible voice signal, control signal and so on from the audio/control unit 330 through a line 314a to form a send signal. The power amplifier 316 amplifies the send signal received from the modulator 314.

The duplexer 318 inputs a receive signal received through the radio communication line 600, the antenna 200 and a line 200a, and sends the receive signal to the demodulator 312 and also sends the send signal received through the modulator 314 and power amplifier 316, to the antenna 200 via the line 200a. The synthesizer 320 is a local oscillator for channel selection which specifies a frequency to be demodulated at the demodulator 312 and also a frequency to be modulated at the modulator 314.

The audio/control unit 330 has a CPU 331, an oscillator/frequency divider 332, an address decoder 333, a ROM 334, a RAM 335, a radio unit controller 336, an audio unit 337, a control signal processor 338, an audio unit controller 339, a digital interface 340, a power supply controller 341, and an interrupt controller 342. In FIG. 2, reference numeral 343 denotes a data bus of eight bits, for example, 344 an address bus and 345 a control bus.

The CPU 331 performs general control over the entire audio/control unit 330.

The oscillator/frequency divider 332 supplies a clock signal to the CPU 331, and also divides the frequency of the clock signal to supply the frequency-divided clock signals to various sections as timing signals. More specifically, the oscillator/frequency divider 332 also generates holding tone signals A and B under control of the CPU 331 and supplies the signals to the audio unit 337. In the illustrated embodiment, it is assumed that the frequency of the holding tone signal A is different from that of the holding tone signal B by such an amount that can be audibly distinguished by a person.

The address decoder 333 outputs predetermined operational signals to the units in accordance with an instruction signal received from the CPU 331. The ROM 334 stores therein various programs necessary for the operation of the CPU 331. The RAM 335 stores therein various data necessary in the processing operation of the CPU 331.

The radio unit controller 336 controls the radio unit 310 under an instruction received from the CPU 331. For example, the radio unit controller 336 instructs the frequency to be specified by the synthesizer 320, an amplification factor to be amplified by the power amplifier 316 and a modulation degree to be modulated by the modulator 314; receives an out-of-synchronism signal from the synthesizer 320 and an output detection signal from the power amplifier 316 for the prevention of erroneous operation; and informs the CPU 331 of it.

The audio unit 337 sends to the control signal processor 338 and voice dial unit 350 the control and audible tone signals contained in the receive signal demodulated at the demodulator 312 respectively, and also sends the audible tone signal to the telephone set 400 through a line 502. Further, the audio unit 337 receives a control signal from the control signal processor 338 to send the control signal to the modulator 314, and also receives an audible tone signal from the telephone set 400 through a line 501 and an audible tone signal from the voice dial unit 350 to send these audible tone signals to the modulator 314.

In addition, the audio unit 337 includes a switching circuit to be explained later, which realizes a hold function. The audio unit 337 also has functions of shaping the control signal to be sent to the control signal processor 338 and of filtering the control signal to be sent to the modulator 314.

The control signal processor 338 achieves bit and frame synchronizations with the control signal received from the audio unit 337, receives, as a parallel signal, control data transmitted from the base station and contained in the control signal of a series signal, and sends as a control signal of a series signal, control data to be transmitted to the base station as a parallel signal to the audio unit 337.

The audio unit controller 339 carries out various sorts of control over the audio unit 337. For example, the audio controller 339 controls the sending operation of the receive signal from the audio unit 337 to either one of the control signal processor 338, voice dial circuit 350 and telephone set 400; and also controls the selective reception of the send signal from the control signal processor 338, the voice dial unit 350 or telephone set 400 to the audio circuit 337.

The digital interface 340 forms an interface between the the transceiver 300 and telephone set 400 through lines 503 with respect to signals to be transferred therebetween.

The power supply controller 341 controls the power supply 390. More concretely, the power supply controller 341 controls the power supply 390 in such a manner that the power supply 390 receives a voltage supplied from the battery, changes the supplied voltage to a predetermined voltage, and supplies the predetermined voltage to the units.

The interrupt controller 342 receives an interrupt command from the units and sends the command to the CPU 331.

Figure 3:
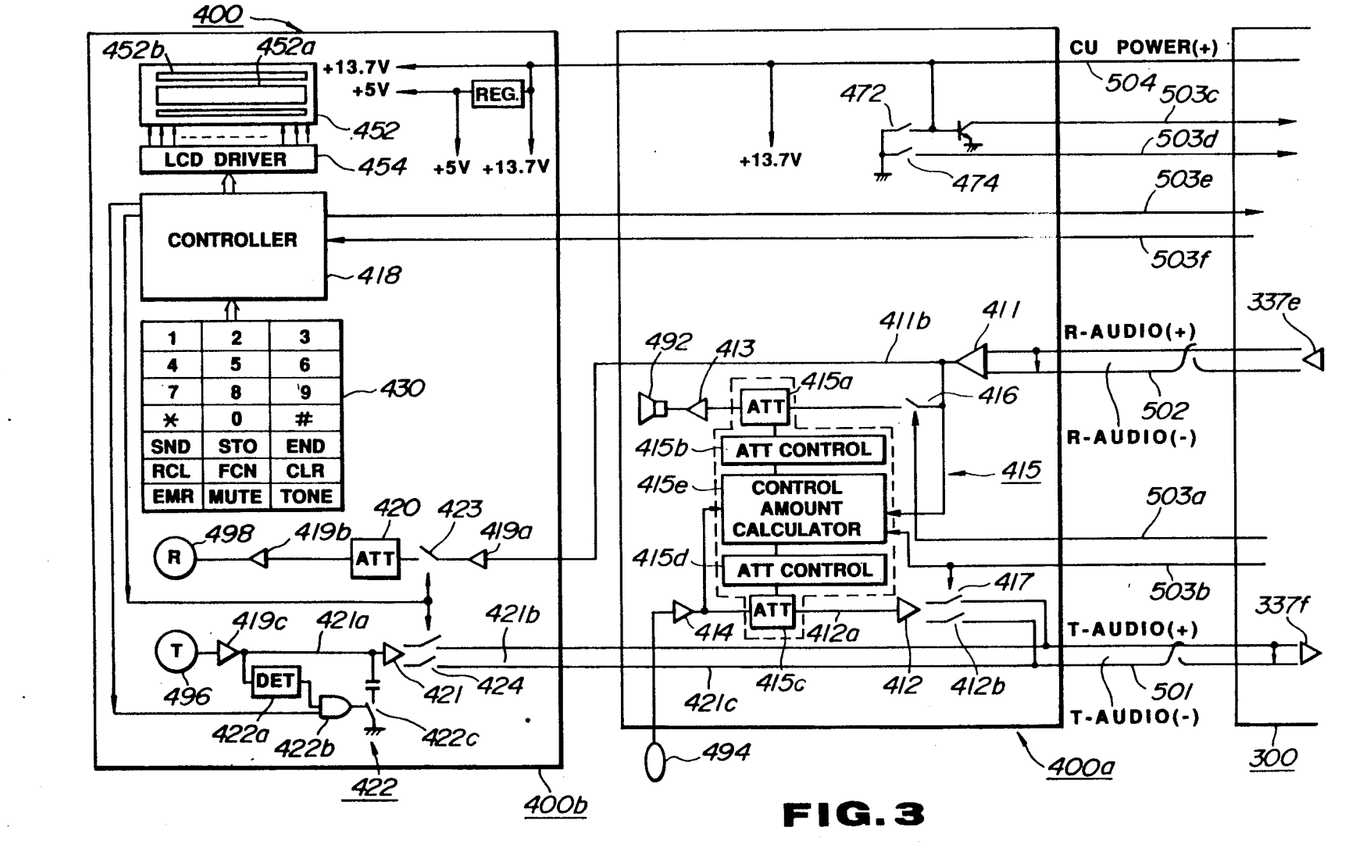
FIG. 3 shows an arrangement of a telephone set used in the car telephone system.

Shown in FIG. 3 is the details of arrangement of the telephone set 400 in FIG. 1. In FIG. 3, lines 503a to 503f correspond to the line 503 in FIG. 1. Further, balanced lines 501 and 502 correspond to the lines 501 and 502 in FIG. 1, respectively.

As already mentioned earlier, the telephone set 400 includes, as shown in FIG. 3, the telephone set body 400a and the handset 400b. In the telephone set body 400a, a B/U converter 411, a U/B converter 412, amplifiers 413 and 414, an echo canceller 415, and switches 416 and 417 form a part of the audio/control unit 410 shown in FIG. 1; the hand-free microphone 494 and the loudspeaker 492 form a part of the voice input/output unit 490 shown in FIG. 1; and a hook switch 472 and an on/off switch 474 form a part of the switch section 470 shown in FIG. 1.

In more detail, the B/U converter 411 converts a voice signal received from the audio unit 337 of the transceiver 300 in FIG. 2 through the balanced line 502 and sends the converted voice signal onto an unbalanced line 411b. The signal on the unbalanced line 411b is further amplified at the amplifier 413 and sounded from the loudspeaker 492. Since the voice signal issued from the audio unit 337 of the transceiver 300 is a signal on an unbalanced line, the voice signal is converted into the signal on the balanced line by a U/B converter 337e provided immediately downstream the audio unit 337.

The U/B converter 412 converts the voice signal on an unbalanced line 412a, which is input by means of the hand-free microphone 494 and amplified by the amplifier 414, into the voice signal on a balanced line 412b. The voice signal converted into the signal on the balanced line 412b is then transferred to the audio unit 337 of the transceiver 300 through the line 501.

Since the voice signal acceptable to the audio unit 337 of the transceiver 300 is a signal on an unbalanced line, the voice signal is converted on a signal on an unbalanced line by a B/U converter 337f which is provided immediately upstream the audio circuit 337.

The echo canceller 415 has an attenuator 415a for attenuating the voice signal to be supplied from the B/U converter 411 to the amplifier 413, an attenuator controller 415b for controlling the attenuation factor of the attenuator 415a, an attenuator 415c for attenuating the voice signal to be supplied from the amplifier 414 to the U/B converter 412, an attenuator controller 415d for controlling the attenuation factor of the attenuator 415c, and a control amount calculator 415e for calculating the amounts of control of the respective attenuator controllers 415b and 415d on the basis of the voice signals on the respective lines. The switch 416 functions to select whether or not the voice signal received from the B/U converter 411 is sounded from the loudspeaker 492. The switch 417 functions to select whether or not the voice signal received from the hand-free microphone 494 is transmitted to the audio unit 337 of the transceiver 300. The selective switching operation of these switches 416 and 417 is carried out on the basis of control signals supplied from the audio/control unit 330 of the transceiver 300 through lines 503a and 503b respectively.

The hook switch 472 detects an on-hook or off-hook state of the handset 400b. A signal detected by the hook switch 472 is transmitted to the audio/control unit 330 of the transceiver 300 through a line 503c.

The on/off switch 474 is used to turn ON or OFF the entire car telephone system 100 and an ON or OFF signal generated from the switch 474 is transmitted to the audio/control unit 330 of the transceiver 300 through a line 503d.

In the handset 400b, a controller 418, amplifiers 419a, 419b and 419c, an attenuator 420, a U/B converter 421, a voice switch section 422, switch 423 and 424 form a part of the audio/control unit 410 in FIG. 1; a liquid crystal display 452, and an LCD driver 454 form the display 450 in FIG. 1; and the handset microphone 496 and handset receiver 498 form a part of the voice input-/output unit 490. The handset 400b is provided with the key section 430 comprising a plurality of keypads.

The controller 418 performs general control over the entire handset 400b on the basis of a control signal received from the audio/control unit 330 of the transceiver 300 through a line 503e, and sends to the audio/control unit 330 of the transceiver 300 a control signal and so on received from the key section 430.

The amplifiers 491a and 419b are provided to amplify the voice signal sent from the B/U converter 411 of the telephone set body 400a. The attenuator 420 attenuates the voice signal. The voice signal passed through the amplifier 419a, attenuator 420 and amplifier 419b is then sounded at the handset receiver 498.

The amplifier 419c amplifies the voice signal sent from the handset microphone 496. The U/B converter 421 converts the amplified voice signal on an unbalanced line 421a to a signal on a balanced line 421b. The signal on the balanced line 421b is then sent to the audio unit 337 of the transceiver 300 through balanced lines 421c and through the balanced line 501 on the telephone set body 400a. The switch 423 selects whether or not the voice signal received from the B/U converter 411 is sounded at the handset receiver 498, while the switch 424 selects whether or not the voice signal received from the handset microphone 496 is sent to the audio unit 337 of the transceiver 300.

The liquid crystal display 452 has a number display part 452a for indicating a number of several digits and a display part 452b for indicating a plurality of functions. The LCD driver 454 drives the liquid crystal display 452 under control of the controller 418 to cause predetermined data to be displayed on the display 452.

The key section 430 comprises keypads of number keys "0" to "9" and function keys "*", "#", "SND", "STO", "END", "RCL", "FCN", "CLR", "EMR", "TONE" and "MUTE" for setting the hold state of the present invention. A depression of any key on the key section 430 is recognized by the controller 418.

Figure 4:
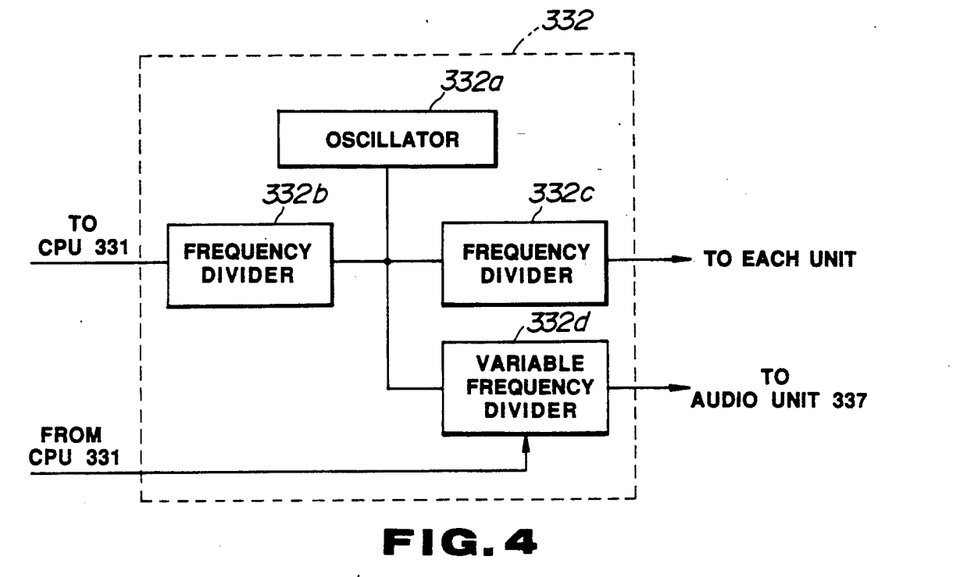
FIG. 4 is a block diagram showing an exemplary specific arrangement of an oscillator/frequency divider used in the transceiver.

FIG. 4 shows an exemplary arrangement of the oscillator/frequency divider 332 in FIG. 2. In the drawing, the oscillator/frequency divider 332 includes an oscillator 332a for generating a predetermined frequency, e.g., a rectangular signal, frequency dividers 332b and 332c, and a variable frequency divider 332d for allowing two-stage switching of a frequency division ratio. The frequency divider 332b divides the frequency of an output of the oscillator 332a to generate a clock signal for the CPU 331. That is, the clock signal is supplied from the oscillator 332b to the CPU 331. The frequency divider 332c divides the frequency of the output of the oscillator 332a to generate a timing signal for each unit of the transceiver 300. That is, the timing signal is supplied to the respective units of the transceiver 300. The variable frequency divider 332d divides the frequency of the output of the oscillator 332a to generate holding tone signals A and B respectively having different frequencies. The holding tone signals A and B are supplied from the variable frequency divider 332d to the audio circuit 337. The selection of the holding tone signal A or B to be generated at the variable frequency divider 332d is determined by a control signal received from the CPU 331. As already explained earlier, the frequency difference between the holding tone signals A and B is set to such an extent that can be audibly distiguished by humans.

Figure 5:
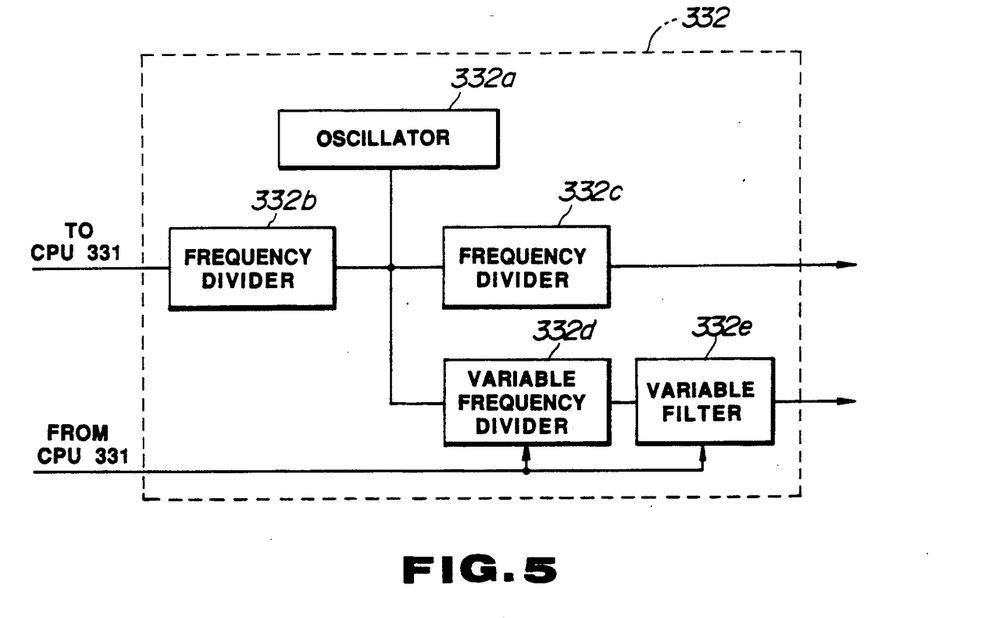
FIG. 5 is a block diagram showing another exemplary arrangement of the oscillator/frequency divider in the transceiver.

Referring to FIG. 5, there is shown another exemplary arrangement of the oscillator/frequency divider 332 in FIG. 2. The arrangement of FIG. 5 is different from that of FIG. 4 only in that a variable filter 332e whose frequency characteristic can be varied based on the control signal received from the CPU 331 is provided at the output side of the variable frequency divider 332d of FIG. 4. More specifically, the difference between the holding tone signals A and B is sufficient to allow persons to be able to audibly distinguish therebetween. Thus, in the arrangement of FIG. 5, the variable filter 332e provides such a tone difference to the holding tone signals A and B that persons can audibly distinguish the holding tone signals A and B. In the arrangement of FIG. 5, however, the variable frequency divider 332d may be eliminated to provide only the tone difference between the holding tone signals A and B, if necessary.

Figure 6:
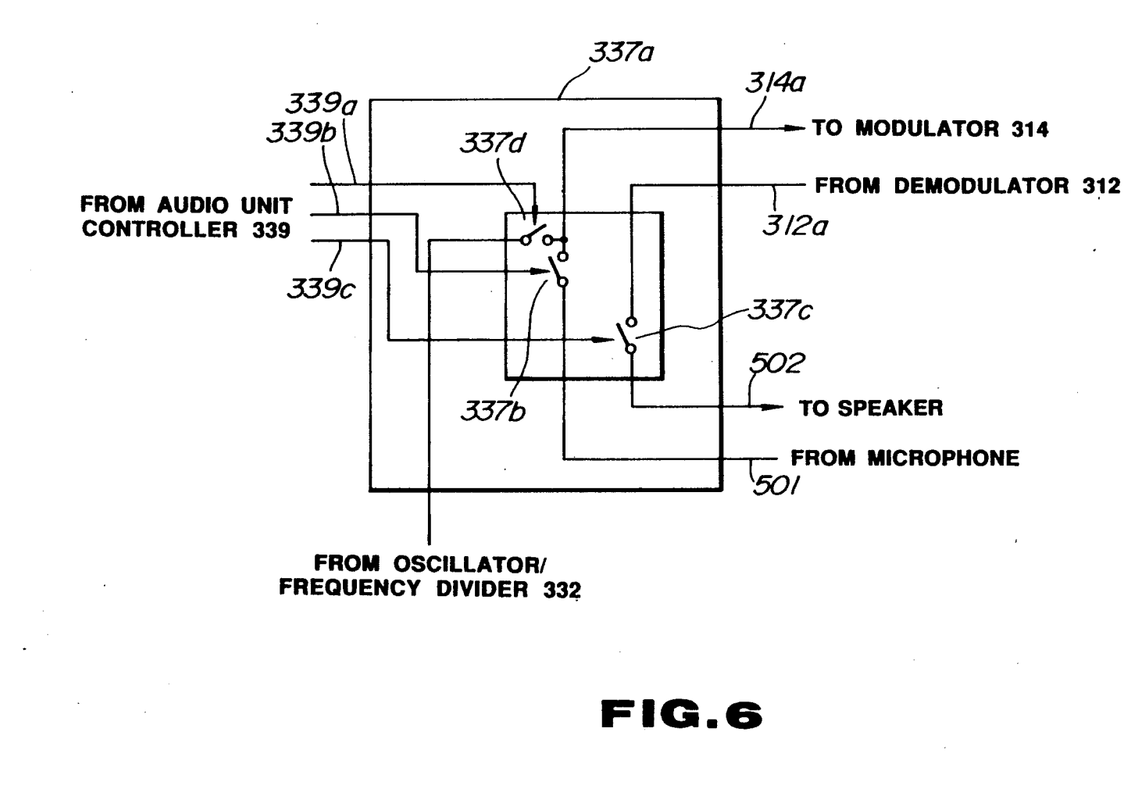
FIG. 6 schematically shows a switching circuit in an audio circuit.

FIG. 6 schematically shows an arrangement of a switching circuit 337a provided in the audio unit 337. The switching circuit 337a has a first switch 337b for selectively sending to the modulator 314 a signal received from the microphone of the telephone set 400 through the line 501, a second switch 337c for selectively sending to the loudspeaker of the telephone set 400 through the line 502 a signal received from the demodulator 312, and a third switch 337d for selectively sending to the modulator 314 the holding tone signal A or B received from the oscillator/frequency divider 332. More in detail, the switching operation of these first to third switches is carried out under control of the CPU 331 on the basis of control signals received from the audio controller 339 through the lines 339a, 339b and 339c.

Explanation will next be made as to the hold function of the car telephone system 100 having such an arrangement as mentioned above by referring to a flowchart of FIG. 7. The hold function is carried out in the speech mode.

Figure 7:
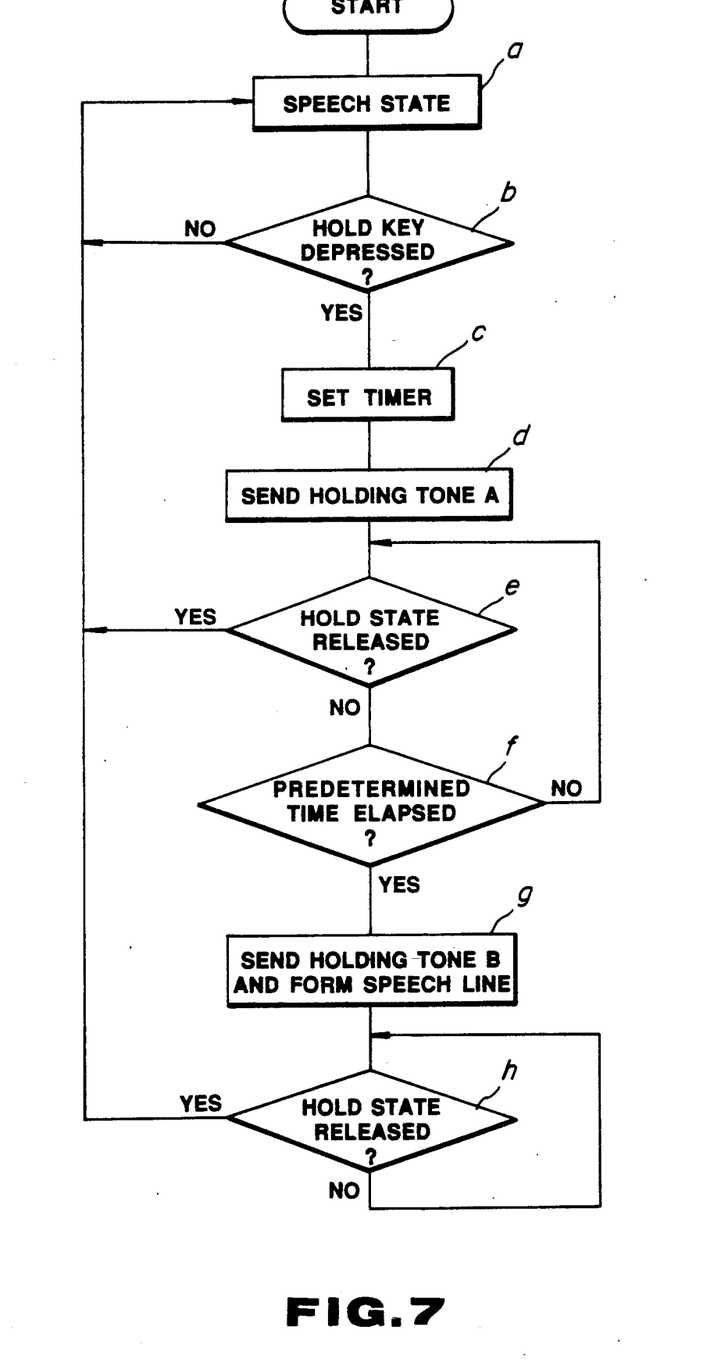
FIG. 7 is a flowchart for explaining the operation of a hold function of the car telephone system to be carried out in a speech mode.

More specifically, in the speech mode (step a), on the basis of the outputs of the audio controller 339, the first and second switches 337b and 337c are closed and the third switch 337d is opened in the switching circuit 337a of the audio circuit 337. Under this condition, the voice signal received from the microphone (from the hand-free microphone 494 or the handset microphone 496) of the telephone set 400 through the line 501 is transmitted to the party through the first switch 337b of the switching circuit 337a of the audio unit 337, modulator 312, power amplifier 316, duplexer 318, antenna 200 and radio communication line 600; while the voice signal received from the party through the antenna 200 is output from the loudspeaker (the loudspeaker 492 or handset receiver) of the telephone set 400 through the duplexer 318, demodulator 312, second switch 337c of the switching circuit 337a of the audio circuit 337 and line 502.

At this stage, when the operator depresses the hold key "MUTE" of the key section 430 of the handset 400b to set the hold state (step b), this is detected by the controller 418 of the handset 400b and a signal indicative of the depression of the key "MUTE" is transmitted from the controller 418 to the CPU 331 through the line 503e and the digital interface 340 of the transceiver 300. This causes the CPU 331 to control the audio controller 339, which results in that the first and second switches 337b and 337c are released (opened) and the third switch 337d is closed in the switching circuit 337a of the audio unit 337. The CPU 331 also sets a timer incorporated therein (step c) to start measuring a predetermined time, and controls the oscillator/frequency divider 332 to oscillate the holding tone signal A and supply the signal A to the audio circuit 337. Under this condition, since the first and second switches 337b and 337c are released, the voice from the microphone of the telephone set 400 is not transmitted to the party, while the voice from the party is not output from the loudspeaker of the telephone set 400. Since the third switch 337d is closed, on the other hand, the holding tone signal A from the oscillator/frequency divider 332 is transmitted to the party through the third switch 337d, modulator 312, power amplifier 316, duplexer 318, antenna 200 and radio communication line 600 (step d). In other words, the user voice is not transmitted to the party and only the holding tone signal A is transmitted to the party while the voice from the party is not output from the loudspeaker. That is, the system is set in its usual hold state.

When the hold state is not released (step e) and the predetermined time of the aforementioned timer elapses (step f), the CPU 331 controls the audio controller 339 with the result that the first switch 337b is released and the second and third switches 337c and 337d are closed. The CPU 331 also controls the oscillator/frequency divider 332 to oscillate the holding tone signal B and supply the signal B to the audio circuit 337 (step g). Under this condition, since the first switch 337b is released, the user voice from the microphone is not transmitted to the party, while since the third switch 337d is closed, only the holding tone signal B is transmitted to the party. However, since the second switch 337c is closed, the voice from the party is output from the loudspeaker of the telephone set 400 through the duplexer 318, demodulator 312, second switch 337c of the switching circuit 337a of the audio unit 337 and line 502.

Thereafter, when a depression of the key "MUTE" causes the hold state of the system to be released (state h), the system is returned to its usual speech mode (step a).

In this way, with the car telephone system of the present embodiment, when the hold state is set in the speech mode, the passage of the predetermined time enables the holding tone signal B different from the first holding tone signal A to be transmitted to the party and also enables the speech signal transmitted from the party to the user of the radio telephone system.

In other words, the party being asked to hold on can recognize by means of a change in the hold tone that the party's voice can be transmitted to the user side, so that if the party speaks, then the party's voice is output at the user side.

Accordingly, in the hold state of the system, the waiting time of the party can be shortened. Further, since party's voice is output at the user side only after passage of the predetermined time, the user can hear the party's voice with less noise.

Although the frequency or tone difference between the holding tone signals A and B has been set to such an extend that can be audibly distinguished by persons in the foregoing embodiments, the present invention may also be realized with use of holding tone signals of different volumes.

What is claimed is:

1. A radio telephone system having a function of selectively allowing a party to transmit a speech signal to a user of the radio telephone system during a hold state set by the user, comprising:
   hold set means for setting the radio telephone system in a hold state during speech to inhibit transmission of a speech signal to the party and also to inhibit transmission of a speech signal from the party;
   time measuring means for starting measuring a predetermined period of time when said hold set means sets said hold state; and
   means for allowing the voice signal from the party to be transmitted during said hold state when said time measuring means completes its measuring operation of said predetermined period of time.

2. A radio telephone system as set forth in claim 1, wherein said hold set means includes a manual switch to be operated by the user of the radio telephone system.

3. A radio telephone system as set forth in claim 1, wherein the radio telephone system is a car telephone system and said hold set means includes a predetermined function key for said car telephone system.

4. A radio telephone system having a function of selectively allowing a party to transmit a speech signal to a user of the radio telephone system during a hold state set by the user, comprising:
first hold set means for setting the radio telephone system in a first hold state during speech to inhibit transmission of a speech signal to the party and also to inhibit transmission of a speech signal from the party; and
second hold set means for automatically setting the radio telephone system in a second hold state to allow said voice signal from the party to be transmitted to the user during said second hold state when a predetermined period of time elapses after said first hold set means sets the radio telephone system in said first hold state.

5. A radio telephone system as set forth in claim 4, wherein said hold set means includes a manual switch to be operated by the user of the radio telephone system.

6. A radio telephone system as set forth in claim 4, wherein the radio telephone system is a car telephone system and said hold set means includes a predetermined function key for said car telephone system.

7. A radio telephone system having a function of selectively allowing a party to transmit a speech signal to a user of the radio telephone system during a hold state set by the user, comprising:
first hold set means for setting the radio telephone system in a first hold state during speech to inhibit transmission of a speech signal to the party and also to inhibit transmission of a speech signal from the party;
first information means for informing the party that said first hold state is set when said first hold set means sets the radio telephone system in said first hold state;
second hold set means for automatically setting the radio telephone system in a second hold state to allow said voice signal from the party to be transmitted to the user during said second hold state when a predetermined period of time elapses after said first hold set means sets the radio telephone system in said first hold state; and
second information means for informing the party that said second hold state is set when said second hold set means sets the radio telephone system in said second hold state.

8. A radio telephone system as set forth in claim 7, wherein said hold set means includes a manual switch to be operated by the user of the radio telephone system.

9. A radio telephone system as set forth in claim 7, wherein the radio telephone system is a car telephone system and said hold set means includes a predetermined function key for said car telephone system.

10. A radio telephone system as set forth in claim 7, wherein said first information means sends a first hold tone to the party.

11. A radio telephone system as set forth in claim 7, wherein said second information means sends to the party a second hold tone distinguishable from said first hold tone.

12. A radio telephone system as set forth in claim 11, wherein said second hold tone is different in frequency from said first hold tone.

13. A radio telephone system as set forth in claim 11, wherein said second hold tone is different in tone from said first hold tone.

14. A radio telephone system as set forth in claim 11, wherein said second hold tone is different from said first hold tone in at least one of frequency, tone and volume.

15. A radio telephone system having a function of selectively allowing a party to transmit a speech signal to a user of the radio telephone system during a hold state set by the user, comprising:
manual operating means, to be manually operated by the user of the radio telephone system, for setting the radio telephone system in a hold state;
first hold tone sending means for sending a first hold tone to the party when said manual operating means sets the radio telephone system in said hold state;
time measuring means for starting measuring a predetermined period of time when said manual operating means sets the radio telephone system in said hold state;
second hold tone sending means for sending a second hold tone to said party when said time measuring means completes its measuring operation of the predetermined period of time; and
means for allowing a speech signal from the party to be transmitted to the user of the radio telephone system when said time measuring means completes the measuring operation of the predetermined period of time.

16. A radio telephone system as set forth in claim 15, wherein the radio telephone system is a car telephone system and said manual operating means is a mute function key.

17. A radio telephone system having a function of selectively allowing a party to transmit a voice signal to a user of the radio telephone system during a hold state set by the user, comprising:
a transceiver having a radio circuit and carried on a vehicle;
a telephone set connected with said transceiver;
manual operating means, provided in said telephone set to be manually operated by the user of the radio telephone system, for inhibiting sending of a voice signal to the party through said transceiver and for inhibiting sending of a voice signal from the party by setting a hold state in which a communication channel with the party is maintained;
first hold tone sending means, provided in said transceiver, for sending a first hold tone to the party when said manual operating means sets the radio telephone system in said hold state;
time measuring means, provided in said transceiver, for starting measuring a predetermined period of time when said manual operating means sets the radio telephone system in said hold state;
second hold tone sending means, provided in said transceiver, for sending a second hold tone to the party when said time measuring means completes measuring of the predetermined period of time; and
means, provided in said telephone set, for allowing the party to send said voice signal to the user of the radio telephone system after said time measuring means completes measuring of the predetermined period of time.

18. A radio telephone system as set forth in claim 4, wherein said second hold set means inhibits transmission of a speech signal from the user to the party by setting the radio telephone system in said second hold state.

19. A radio telephone system as set forth in claim 7, wherein said second hold set means inhibits transmission of a speech signal from the user to the party by setting the radio telephone system in said second hold state.

* * * * *